United States Patent [19]
Khusro

[11] Patent Number: 4,818,173
[45] Date of Patent: Apr. 4, 1989

[54] ROBOT ARM MEMBER RELATIVE MOVEMENT SENSING APPARATUS

[75] Inventor: Mohammed M. Khusro, Andover, Mass.

[73] Assignee: Polaroid Corporation, Cambridge, Mass.

[21] Appl. No.: 484,228

[22] Filed: Apr. 12, 1983

[51] Int. Cl.[4] .......................... B25J 9/00; B25J 17/02
[52] U.S. Cl. .................................... 414/735; 901/45;
901/47; 901/29; 901/9; 73/800; 338/15;
356/152
[58] Field of Search ................. 414/735; 901/44, 45,
901/46, 47, 29, 9; 73/800; 356/141, 152, 153,
150; 33/1 PT, 1 MP, 363 K, 314, 169 C, 309;
340/709, 365 P; 338/15, 128; 178/18; 250/227,
561, 211 K, 221

[56] References Cited

U.S. PATENT DOCUMENTS

| | | | |
|---|---|---|---|
| 2,317,632 | 4/1943 | Miller | 33/309 |
| 2,792,637 | 5/1957 | Seigel et al. | 33/314 |
| 3,526,748 | 9/1970 | Reinks | 219/131 |
| 3,703,682 | 11/1972 | Wickman et al. | 356/152 X |
| 3,824,674 | 7/1974 | Inoyama et al. | 901/45 X |
| 3,918,814 | 11/1975 | Weiser | 356/152 X |
| 4,076,131 | 2/1978 | Dahlstrom et al. | 414/735 X |
| 4,179,783 | 12/1979 | Inoyama et al. | 901/46 X |
| 4,309,618 | 1/1982 | Carter, Jr. | 901/46 X |
| 4,330,204 | 5/1982 | Dye | 356/152 |
| 4,445,029 | 4/1984 | Nagaoka et al. | 250/201 AF |

OTHER PUBLICATIONS

IBM Technical Disclosure Bulletin, "Position Detecting Apparatus", H. R. Rottman, vol. 9, #5, Oct. 1966.

Primary Examiner—Robert J. Spar
Assistant Examiner—Donald W. Underwood
Attorney, Agent, or Firm—John J. Kelleher

[57] ABSTRACT

Apparatus for determinig when the gripper or hand of a robot arm, resiliently mounted on a robot arm body with a set of highly compliant springs, strikes or makes contact with an object that impedes or limits hand movement. The apparatus includes a light source, preferably mounted in a particular location on the robot arm hand and a light sensitive device cooperatively mounted in a particular location on the robot arm body, a device is capable of continuously generating hand-to-robot arm body relative position signals in response to the position of optically focused light from the light source impinging on the light sensitive device. Relative movement between the robot arm body and the robot hand normally resulting from contact between a motion impeding object and the robot hand causes the light sensitive device to generate a signal indicative of such object contact and/or extent of relative hand-to-robot arm body movement. This signal may be employed, for example, to either terminate robot arm movement or cause a particular force to be applied to the object contacted by the robot hand.

19 Claims, 6 Drawing Sheets

ROBOT ARM MEMBER RELATIVE MOVEMENT SENSING APPARATUS

BACKGROUND OF THE INVENTION

The present invention relates to positioning apparatus, in general, and to apparatus for controlling the movement of a positioning or force generating device commonly referred to as an industrial robot, in particular.

Automated product assembly machines, for example, have been employed in manufacturing industries for a great number of years. More recently, though, technologically more sophisticated machines have been employed for such purposes. These more recent machines are commonly referred to as industrial robots. Industrial robots are capable of performing various mechanical operations with a high degree of speed and accuracy in response to a set of programmed instructions.

Common uses for industrial robots include the movement of a workpiece from one position to another and the performance of repetitive operations with a high degree of precision. The use of industrial robots in place of human personnel has proven very beneficial in that they have resulted in both cost reductions and processing accuracy and have relieved many personnel from performing routine and/or potentially hazardous jobs. Industrial robots are also employed in numerous other fields of technology to perform a variety of different operations.

A significant problem associated with industrial robots, especially those employed for product assembly purposes, is their inability to recognize when they collide or make contact with objects located in their paths of travel when moving to perform programmed tasks. Inasmuch as most industrial robots are capable of generating extremely large physical forces, such forces can seriously damage or even destroy such contacted objects, objects that have heretofore been undetectable when struck or contacted by any portion of a moving robot. A typical object damaging situation often occurs when an industrial robot is programmed to place a series of identical objects or piece-parts into fairly close tolerance openings or recesses in, for example, a series of identical housings, during product assembly, over an extended period of time. During this extended period of product assembly time, a gradual misalignment will often result between, for example, the center of the housing opening and the center of the piece-part that is being inserted into the housing opening, misalignment that has heretofore been undetectable. The consequences of the robot being unable to detect such misalignment often is damage to the piece-part, to the housing or to the robot itself because of the large physical forces likely to be involved as the robot blindly attempts to place a piece-part in a misaligned housing opening where it is incapable of detecting such misalignment.

A primary object of the present invention is to provide apparatus for detecting relative movement between members that are resiliently attached to one another.

Another object of the present invention is to provide apparatus for determining when a portion of an industrial robot arm comes in contact with a robot arm-motion impeding object.

Another object of the present invention is to provide apparatus for terminating movement of an industrial robot whenever a portion of said robot strikes or comes in contact with a movement-impeding object.

A further object of the present invention is to provide apparatus that will enable an industrial robot to apply a predetermined physical force to a particular object or workpiece such as when components are required to be forced together during product assembly.

A still further object of the present invention is to provide apparatus for accurately determining the initial or null position of a robot hand for minimum time consuming, initial robot hand position-describing, robot arm programming purposes.

Other objects, features and advantages of the present invention will be readily apparent from the following description of the preferred embodiment thereof taken in conjunction with the accompanying drawings.

SUMMARY OF THE INVENTION

In accordance with the teachings of the present invention, apparatus is provided for determining when a relatively movable driven member moves out of positional alignment with respect to a drive member. The apparatus includes means for resiliently attaching said members to one another such that they are maintained in a predetermined positional relationship relative to one another. An optically focused light source is mounted in a particular location on one member and a light sensitive device capable of continuously generating a member-to-member relative position signal in response to focused light from said light source striking the light sensitive surface of said light sensitive device, is mounted on the other member. Relative movement between said resiliently attached members causes said light sensitive device to generate an electrical signal representative of the extent of member-to-member relative movement. This signal may be employed to, for example, terminate drive member movement, cause a particular force to be applied to an object by said movable member or to facilitate the programming of a robot arm.

DESCRIPTION OF THE PREFERRED EMBODIMENTS

Figure 1:
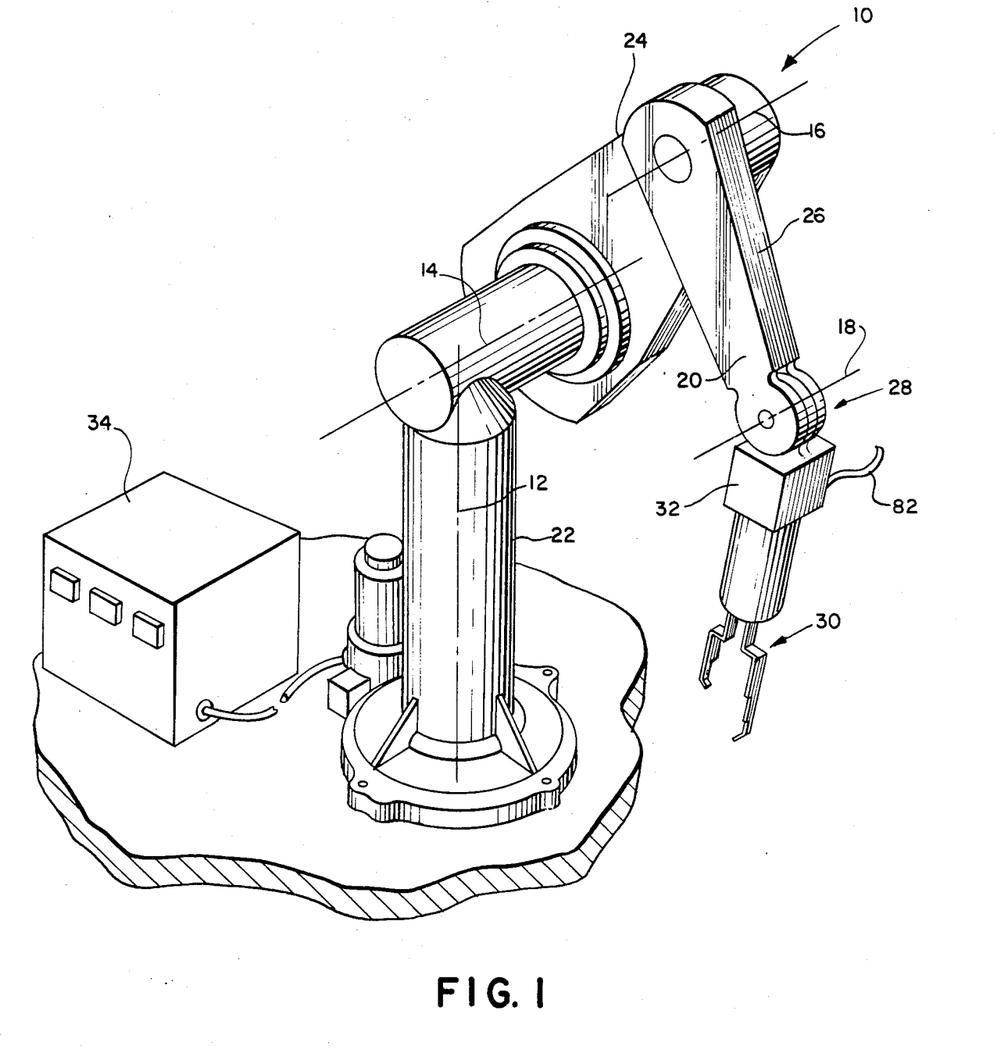
FIG. 1 is a perspective view of a conventional industrial robot incorporating the relative movement sensing apparatus of the present invention.

In FIG. 1 of the drawings, conventional industrial robot or robot arm assembly 10 incorporating a preferred embodiment of the present invention, is depicted. Robot arm assembly 10 is a PUMA Model 600 that is manufactured by Unimation, Inc. of Danbury, Conn. Robot arm assembly 10 operates in accordance with an anthropomorphic coordinate system having six degrees of freedom with portions of said assembly being capable of limited rotational movement about axes 12, 14, 16, 18 and 20. Robot arm assembly 10 includes pedestal 22 having pedestal axis 12 about which all of the upper portions of assembly 10 can be rotated. In addition, lower arm 24 which is rotatably attached to pedestal 22, is rotatable about lower arm axis 14. Upper arm 26 which is rotatably attached to lower arm 24, is rotatable about upper arm axis 16. Wrist joint 28 is rotatable about two mutually orthoginal axes 18 and 20, said joint being tiltable with respect to upper arm 26 and pivotable about axis 20 which is the axis about which pneumatically actuated workpiece-holding gripper 30 is rotated. Gripper 30 is resiliently attached to said wrist joint 28 by relative movement sensing apparatus 32 of the present invention. Sensing apparatus 32 senses relative movement between wrist joint 28 and work-piece holding gripper 30 and generates an electrical signal representative of such relative movement. Robot assembly 10 is programmed by the so-called training method, i.e., gripper 30, that is resiliently attached to upper arm 26 through sensing apparatus 32 is manually moved to the desired gripper position(s) whereupon the coordinates of this particular gripper 30 position are stored in a memory established in robot control assembly 34 for the control of robot assembly 10.

As noted above, pneumatically actuated gripper 30 is resiliently attached to upper arm 26 through or by means of relative motion sensing apparatus 32 which incorporates the preferred embodiment of the inventive concept of the present invention. Relative motion sensing apparatus 32 will now be described in detail. An enlarged elevational view of motion sensing apparatus 32 is shown in drawing FIG. 2 and an exploded perspective view of said apparatus 32 is shown in drawing FIG. 3A. With reference to drawing FIGS. 2 and 3A, photodiode housing 36, lateral effect photodiode 38 and backplate 40 are attached to flange portion 42 of wrist joint 28 by a pair of mounting screws (only screw 44 shown). Photodiode 38 is nested in a recess in one side of housing 36 and the opposite side of housing 36 engages said flange portion 42 of wrist joint 28. Photodiode 38 is a conventional dual-axis (X and Y) lateral effect photodiode that is available from United Detector Technology of Culver City, Calif. Backplate 40, having a pair of mounting screw accepting openings 46A and 46B therein, engages the photodiode recess side of housing 36, thereby sandwiching photodiode 38 between housing 36 and backplate 40 when mounting screws 44, etc. extend through said openings 46A, 46B, through corresponding openings 48A and 48B in photodiode housing 36 and are fully threaded into cooperating threaded openings in wrist joint flange portion 42.

Front plate 50 is resiliently mounted on back plate 40 by a set of three spring-like, laterally resilient, compliant pads (only two, 52A and 52B, are shown). These compliant pads are commercially available from Lord Kinematic of Erie, Pa. A sectional view of one of said spring-like compliant pads, pad 52A, is shown in drawing FIG. 3B. Pad 52A in drawing FIG. 3B consists of a plurality of flat, uniformly stacked, laminated steel disks 53A, 53B, etc., with each disk having a flat surface thereof adjacent another of said disks and with all of said disks being capsulated in an elastomeric material. Compliant pad 52A also includes a pair of mounting caps at the opposite ends thereof having threaded openings therein for mounting the compliant pad to back plate 40 and front plate 50. The ends of compliant pad 52A, for example, are inserted into recesses 56A and 56B in back plate 40 and in front plate 50, respectively, and is attached to said plate by screws 58A and 58B, respectively. The other two compliant pads are mounted to plates 40 and 50 in different plate recesses in the same manner. Compliant pads 52A, 52B, etc., are relatively incompressible or will experience only negligible deformation when force is applied normal to said flat surfaces of each stacked disk, but are flexible or are deformable when shear forces are applied in directions generally lateral to said compressive forces. Laminated elastomeric spring-like compliant pads 52A, 52B, etc., provide multidirectional flexibility, with a chosen or tailored spring constant, in the required directions. These commercially available pads do not require lubrication, require no adjustment, have low hysteresis, can take a fair amount of abuse and have a long life.

High intensity infrared light emitting diode 60 and optical lens 62 are mounted in a fixed position in diode/lens support housing 64. Other light sources such as lasers, laser diodes, non-infrared light emitting diodes or incandescent and fluorescent lamps may also be employed as light sources in place of diode 60. Support housing 64 is positioned in recess 66 in front plate 50 and said housing is fixedly attached to said plate 50 by screws 68A and 68B that pass through openings in tabs 70A and 70B, respectively, projecting from said housing 64 and into threaded openings in said front plate 50. In this position infrared light from housing 64 mounted light emitting diode 60 is focused by conventional optical lens 62, in the shape of a relatively small circular spot, on light sensitive surface 72 of lateral effect photodiode 38. Pneumatic housing portion 74 of pneumatically actuated gripper 30 is attached to diode/lens support housing 64 by a pair of screws 76A and 76B that pass through openings in pneumatic housing 74 of gripper 30 and into threaded openings in said housing 64. Gripper 30 includes a pair of fingers 78A and 78B that move toward each other for work-piece gripping purposes when tube 80 is pressurized from a pressure source (not shown) by the actuation of a pressure control valve (not shown) in response to a signal from robot arm control system 34 (FIG. 1).

Figure 4A:
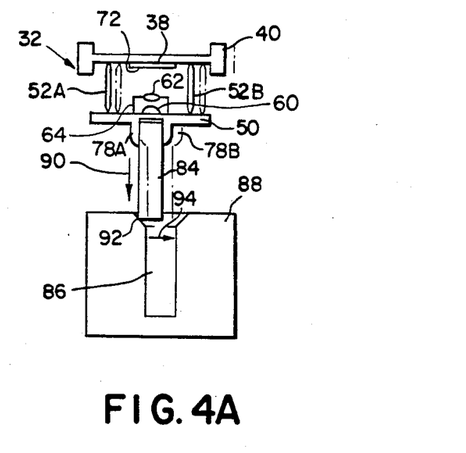
FIG. 4A is a schematic diagram of the initial position of a portion of an axially misaligned piece-part inserting robot arm incorporating the relative motion sensing apparatus of the present invention.
Figure 4B:
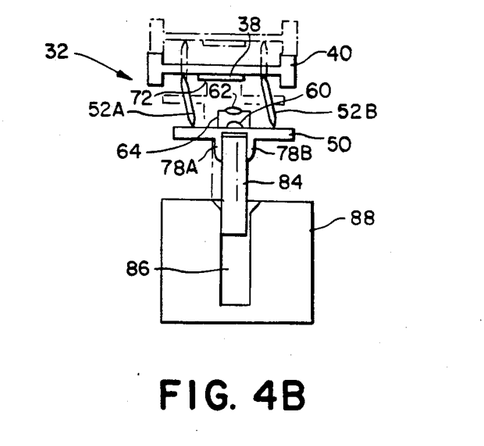
FIG. 4B is a schematic diagram showing the apparatus of FIG. 4 partially inserting the piece-part into a mating piece-part receiving opening.

Movement sensing apparatus 32 is, in part, a compliant device that performs around the point about which rotation will occur when a moment is applied and pure translation occurs when a force is applied to said apparatus 32. FIGS. 4A and 4B schematically show how lateral error is accommodated when interference is experienced by apparatus 32, and FIGS. 5A and 5B schematically show how apparatus 32 mechanically operates when there is a moment-causing axial misalignment between mating parts.

In FIG. 4A, grippers 78A and 78B attached to one end of robot arm 10 (FIG. 1) mounted relative motion sensing apparatus 32 attempts to place pin 84 in opening 86 of receiving member 88 as pin 84 is moved in axial direction 90, but is unable to initially do so because of the interference between pin 84 and champfered surface 92 at the entrance to opening 86 of receiving member 88 due to lateral misalignment of pin 84 with respect to said opening 86. As pin 84 continues to be moved in axial direction 90, such movement and the reaction from champfered surface 92 initiate lateral movement of said pin 84, front plate 50 and support housing 62, on which light emitting diode 60 and light focusing optical lens 62 are mounted, in direction 94. In FIG. 4B, pin 84 has made sufficient lateral movement to enable said pin 84 to fully enter the main portion of opening 86 in receiving member 88. As a direct consequence of this pin 84 lateral movement, spring-like compliant pads 52A, 52B, etc., laterally distort to enable such movement, thereby causing light from diode 60 passing through optical lens 62 and falling in the shape of a spot on photosensitive suface 72 of photodiode 38 to move to another position on said photosensitive surface 72. The effect of such light spot movement on the photosensitive surface of photodiode 38 will be explained below in detial. For the present, however, it is this light spot movement on said light or photosensitive surface that causes photodiode 38 to generate an electrical relative movement or position signal.

Figure 5A:
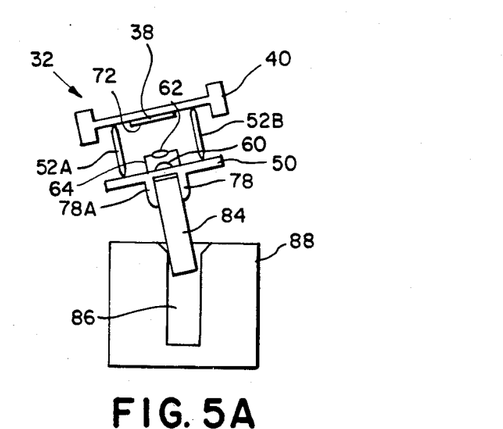
FIG. 5A is a schematic diagram of the initial position of a portion of a piece-part inserting robot arm holding the piece-part at an acute angle to a piece-part receiving opening.
Figure 5B:
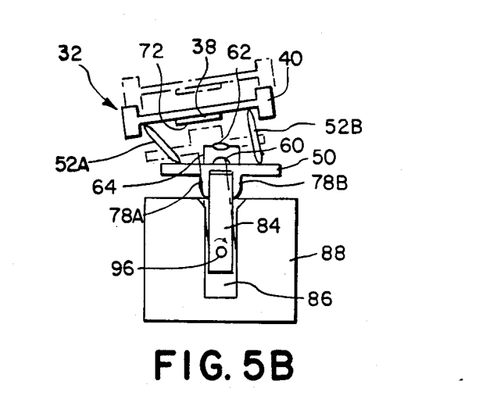
FIG. 5B is a schematic diagram showing the apparatus of FIG. 5A partially inserting the piece part into a mating piece-part receiving opening.

In FIG. 5A, grippers 78A and 78B attached to one end of robot arm 10 (FIG. 1) mounted relative movement sensing apparatus 32 now attempts to place said pin 84 in opening 86 of receiving member 88 as pin 84 is being moved in a direction that is at an acute angle to the longitudinal axis of opening 86. While pin 84 is able to partially enter opening 86, said pin is initially unable to fully enter opening 86 until the longitudinal axis of pin 84 is aligned (parallel and/or coincident) with the longitudinal axis of opening 86, because of the initial angular misalignment. As pin 84 continues to be moved in the same direction, said pin 84, front plate 50 and support housing 64, on which light emitting diode 60 and light focusing optical lens 62 are mounted, experience rotational movement. In FIG. 5B, pin 84 has made sufficient rotational movement about axis 96 to enable said pin 84 to fully enter opening 86 in receiving member 88. As in the previously described example, compliant pads 52A, 52B, etc., laterally distort to enable such rotational movement again causing causing the spot of light from light emitting diode 60 falling on photosensitive surface 72 of photodiode 38 to move to another position on said photosensitive surface, the effect of such movement, as mentioned above, is to be described below in detail.

Figure 2:
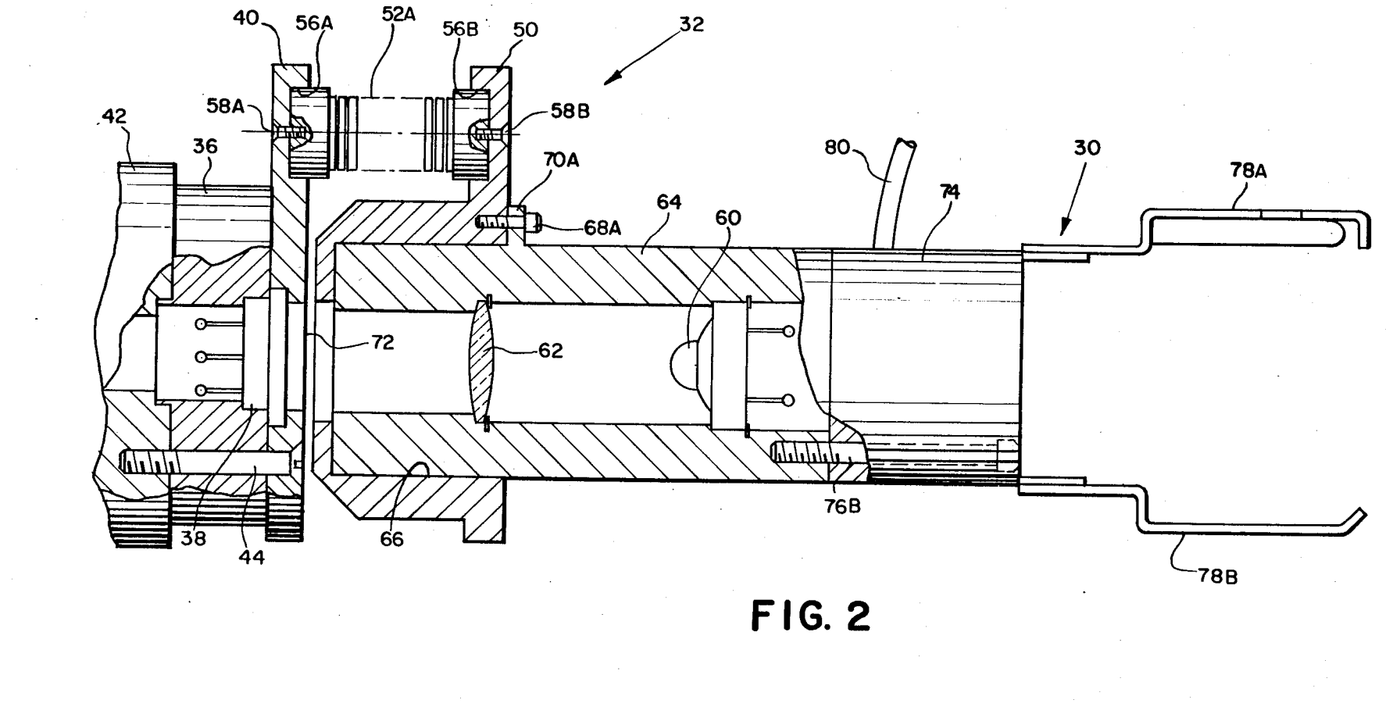
FIG. 2 is an enlarged elevational view, partly in section, of the relative movement sensing apparatus shown in FIG. 1.
Figures 3A, 3B:
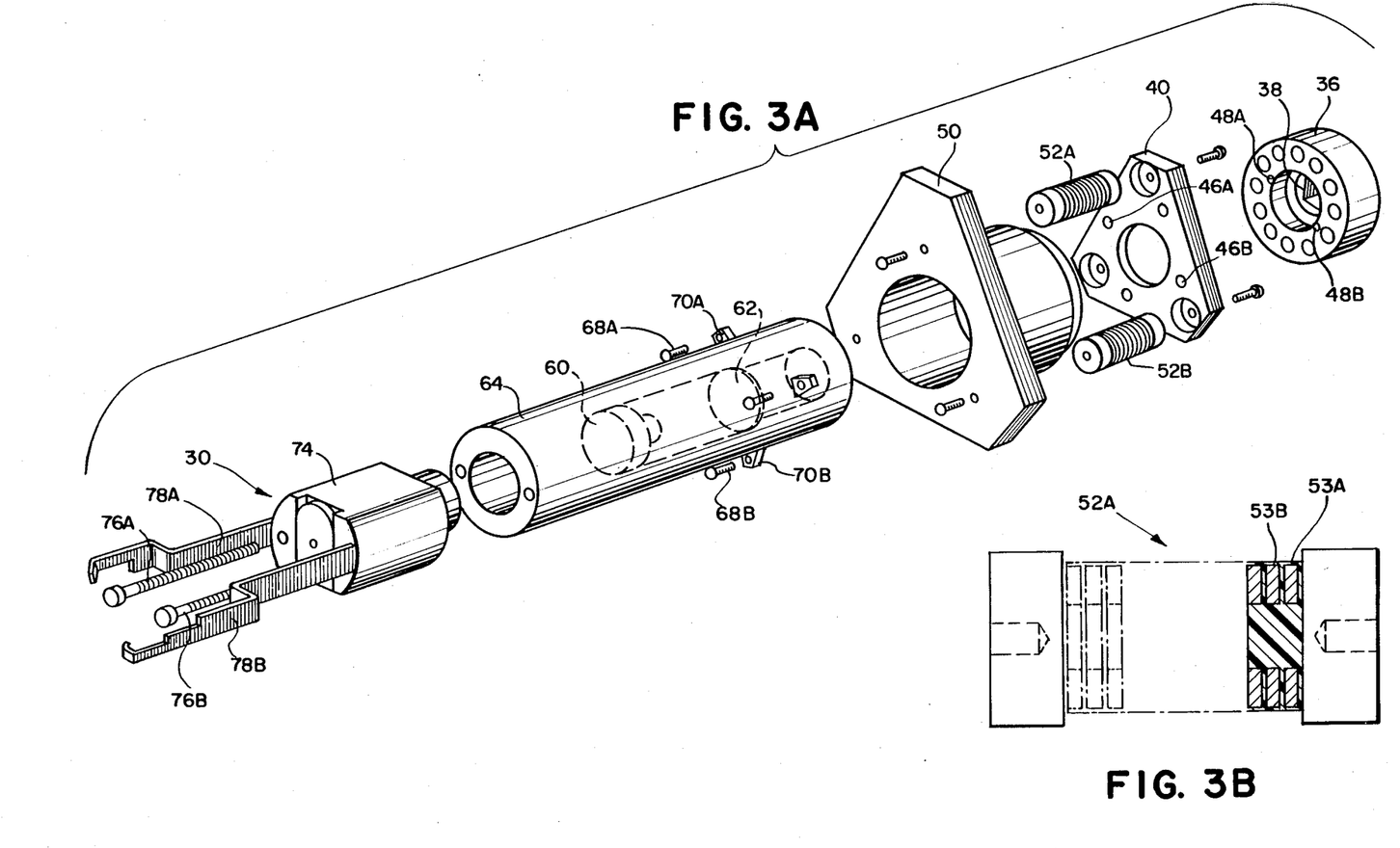
FIG. 3A is an exploded perspective view of the relative motion sensing apparatus shown in drawing FIG. 2.
FIG. 3B is a sectional view, in elevation, of one of the spring-like compliant pads in the relative motion sensing apparatus of the present invention.
Figure 6A:
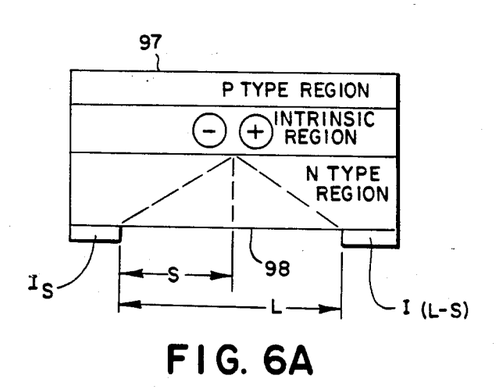
FIG. 6A is a cross-sectional view, in schematic, of the photosensitive device employed in the relative motion sensing apparatus of the present invention.
Figure 6B:
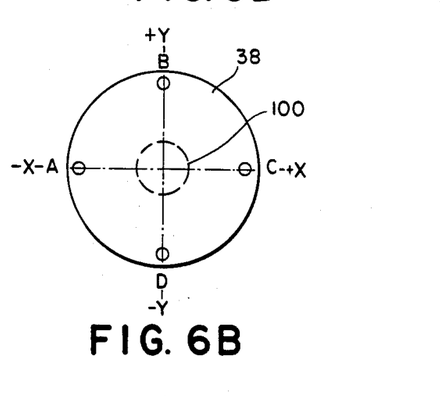
FIG. 6B is a schematic diagram of the external housing of a dual axis photodiode showing four external electrical connections and showing the X and Y coordinates of its light sensitive surface.

The operation of conventional two-terminal single axis lateral effect photodiode 97, is similar in operation to each axis of dual axis lateral effect photodiode 38 in motion sensing apparatus 32 of the present invention. The operation of two-terminal photodiode 97 will now be described in detail. A schematic diagram of said two-terminal photodiode 97 is shown in drawing FIG. 6A. With reference to said FIG. 6A, the current $I_s$ at position S, which is the position on photo-sensitive surface 98 of photodiode 97 where a spot of focused light from a light source falls on said surface, is given by the equation:

$$I_s = I_0(I - S/L)$$

where:
 $I_0$ is photoinduced current
 $I$ line current
 $S$ position S
 $L$ width of detector For a dual axis photodiode such as diode 38 in the motion sensing apparatus of FIG. 2, whose four external contacts are A, B, C and D, as shown in drawing FIG. 6B, the electrical signal representing the X and Y position of a light spot such as light spot 100 in said drawing FIG. 6B, may be expressed as:

X position = A − C/A + C

Y position = B − D/B + D

Figure 7:
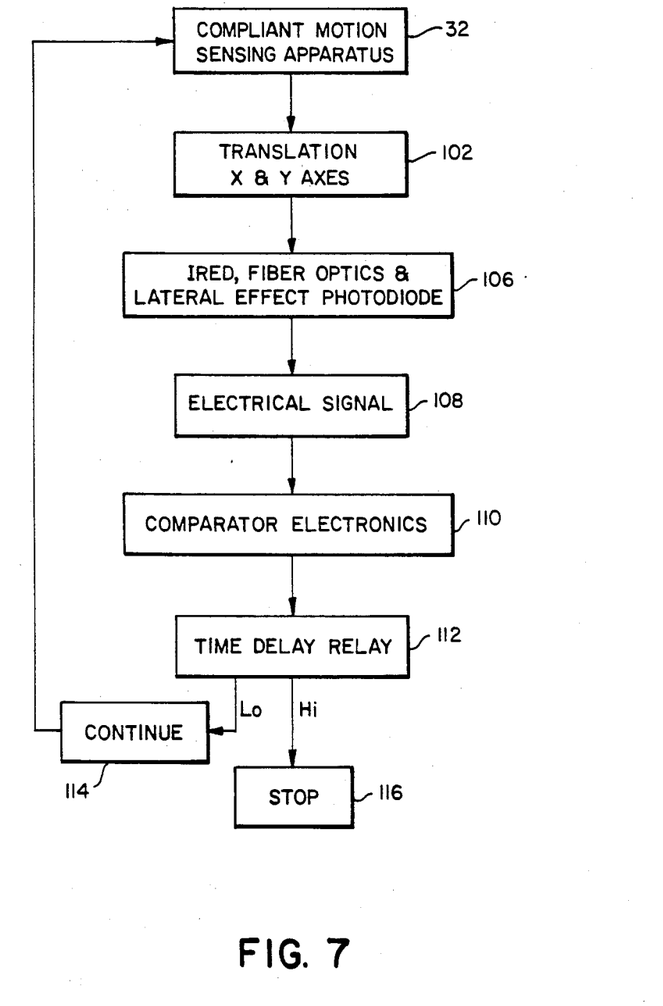
FIG. 7 is an information flow block diagram of the motion sensing apparatus of the present invention operating in its position sensing mode of operation.

As mentioned above, motion sensing apparatus 32 can be employed in at least two different modes of operation. In one mode, changes in the relative position between the robot hand and the robot arm body are monitored for the purpose of interrupting or terminating robot arm movement due to robot arm interference. Another mode of operation, changes in the relative position of the robot hand (gripper 30) and the robot arm body are monitored for the purpose of sensing inertial forces or for applying a force to a body of a predetermined magnitude. FIG. 7 shows an information flow block diagram of the motion sensing apparatus of the present invention operating in the robot arm motion interrupting mode. With reference to FIGS. 4A, 4B and 7, if, for example, front plate 50 of motion sensing apparatus 32 should be laterally moved or translated in the X and/or Y direction (102) against the tailored or chosen force of compliant pads 52A, 52B, etc., the spot of light from high-intensity infrared light emitting diode 60 through optical lens 62 falling on photosensitive surface 72 of photodiode 38 will move from its initial position on said surface 72 to a position linearly related to the relative movement between front plate 50 supporting pneumatically actuated gripper assembly 30, and wrist joint 28 mounted back plate 40 on which is mounted photodiode 38 (106). The relative movement produces an electrical signal (108) representative of such X and-/or Y movement. This signal is compared with predetermined X and Y electrical signal levels (110) and then signal presence in excess of a minimum time duration (112) is determined to filter out false or unwanted mechanical vibrations. If the X or Y signals are less than the predetermined magnitude or are shorter than the predetermined time, the motion sensing apparatus will continue to monitor relative robot hand (gripper) to robot arm body relative movement (114) without interrupting robot arm movement. However, if the X or Y translation signals are more than the predetermined magnitude and persist for more than a predetermined time, compliant motion sensing apparatus 32 will cause robot arm motion to be interrupted (116).

Figure 8:
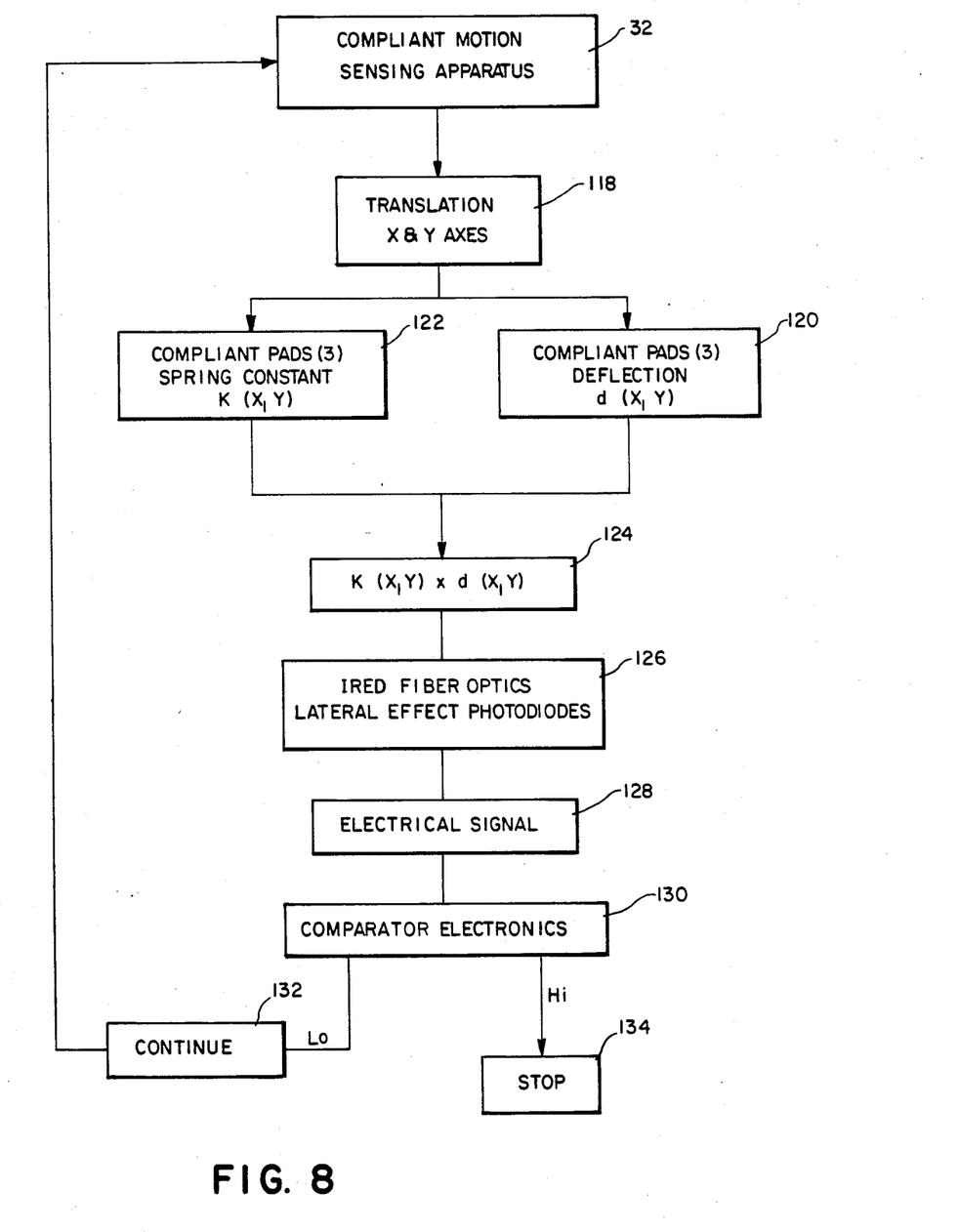
FIG. 8 is an information flow block diagram of the motion sensing apparatus of the present invention operating in its force generating/sensing mode of operation.

FIG. 8 shows the information flow block diagram of motion sensing apparatus 32 of the present invention operating in the robot arm force providing mode. With reference to FIGS. 4A, 4B and 8, if, for example, pin 84 should be brought into contact with a portion of fixedly mounted receiving member 88 by the lateral movement of robot arm assembly 10 (FIG. 1), pin 84 together with front plate 50 of motion sensing apparatus 32 will be laterally displaced or translated in an X and/or Y direction (118) against the tailored or chosen force of compliant pads 52A, 52B, etc. The lateral translation of pin 84 together with front plate 50 of motion sensing apparatus 32 in an X and/or Y direction cause compliant pads 52A, 52B, etc., to laterally deflect a corresponding distance "d" (120). The spring constants K (122) of said compliant pads combine as a product function (124) as said compliant pads are laterally deflected. As front plate 50 moves laterally, the spot of light from high-intensity infrared light emitting diode 60 through optical lens 62 falling on photosensitive surface 72 of lateral effect photodiode 38 will move from its initial position on said surface 72 to a position linearly related to the relative movement between front plate 50 and back plate 40 on which said diode 38 is mounted (126). This relative movement produces an electrical signal (128) representative of such X and/or Y movement. The signal is compared with desired X and/or Y electrical signal levels (130) whose magnitude(s) corresponds to a desired predetermined force. Forces that are generated by the robot arm result from robot arm deflection of compliant pads 52A, 52B, etc., having a known spring constant, a particular distance "d". The deflection of these compliant pads continues (132) until the desired predetermined force is established. Once the force is established, robot arm motion is terminated (134) and the force is maintained.

In addition to the position determining or relative movement sensing and force generating modes described above, motion sensing appartaus 32 can also be employed to determine the null or neutral position of robot hand or gripper 30. By monitoring the current of lateral effect photodiode 32 it is possible to precisely determine said null position which can greatly reduce robot arm programming time.

It will be apparent to those skilled in the art from the foregoing description of my invention that various improvements and modifications can be made in it without departing from its true scope. The embodiments described herein are merely illustrative and should not be viewed as the only embodiments that might encompass my invention.

What is claimed is:

1. Apparatus for sensing load forces exerted along at least selected axes of a work performing mechanism having a driven input portion and a load engaging output portion, said apparatus comprising:
   means connecting said input and output portions for resilient relative displacement along at least one given axis; and
   means for detecting the relative displacement of said portions along a direction at least parallel to said given axis so as to determine the load forces acting in said direction on said output portion as a function of said displacement and the resiliency of said connecting means, said detecting means including a position sensing lateral effect photodiode fixedly mounted with respect to one of said portions having a given photosensitive surface extending in said direction, and means for directing a spot of light to said photosensitive surface from a fixed location with respect to the other of said portions such that the position of said spot of light on the photosensitive surface of said photodiode is a continuous function of the relative displacement of said portions in said direction.

2. The invention of claim 1, wherein said connecting means includes at least one elastomeric element extending generally transverse said given axis with its ends mounted in fixed relation to respective ones of said input and output portions, and said elastomeric element having a relatively high longitudinal spring constant to essentially preclude displacement of said portions along an axis normal to said given axis under relatively heavy load forces acting along said normal axis and a comparatively low lateral spring constant to permit displacement of said portions along said given axis under comparatively light loads.

3. The invention of claim 2, wherein said work performing mechanism is a robotic arm and said output portion is an extended member coupled by said connecting means to said input portion, and said given axis is generally normal to the longitudinal axis of said input portion.

4. The invention of claim 1, additionally including energizeable control means for displacing said input portion, said control means including means for controlling said displacement at least in directions parallel to said given axis in accordance with displacement of said light spot on said photodiode.

5. The invention of claim 4, wherein said control means includes means for terminating further displacement of said input portion when said displacement of said light spot from its no-load position on said photodiode exceeds a given maximum distance.

6. The invention of claim 1, wherein said connecting means includes means for permitting resilient relative displacement of said portions in at least a given plane, and said position sensing photodiode includes a two dimensional photosensitive surface extending in orthogonal directions in said given plane so as to detect displacement over and load forces exerted along said two dimensional area defined by said directions.

7. The invention of claim 6, wherein said photosensitive surface is a planar member mounted in substantially parallel arrangement to said given plane to detect displacement of and load forces acting on said output portion along said given plane.

8. Force sensing apparatus for a robotic arm having a driven input member and a load engaging output member, said apparatus comprising:
   means connecting said members together for resilient relative displacement in at least a given plane; and
   means for detecting the relative displacement of said members in said given plane so as to determine the load forces acting in said given plane on said output member as a function of said displacement and the resiliency of said connecting means in said given plane, said detecting means including a position sensing lateral effect photodiode fixedly mounted with respect to one of said members having a photosensitive surface that extends in a direction parallel to said plane, and means for directing a spot of light to said photodiode from a fixed location with respect to the other of said members such that the position of said spot of light on said photodiode is a function of the relative displacement of said members in said direction.

9. The invention of claim 8, wherein said connecting means includes at least one elastomeric element extending generally transverse said given plane with its ends mounted in fixed relation to respective ones of said input and output members, and said elastomeric element having a relatively high longitudinal spring constant to essentially preclude displacement of said members in a plane normal to said given plane under relatively heavy load forces in said normal plane and a comparatively low lateral spring constant to permit displacement of said members in said given plane under comparatively light loads.

10. The invention of claim 9, wherein said input member is an extended member and said given plane is essentially normal to the longitudinal axis of said input member.

11. The invention of claim 10, additionally including energizeable control means for displacing said arm, said control means including means for controlling said arm displacement at least in directions parallel to said given plane in accordance with displacement of said light spot on said photodiode.

12. The invention of claim 11, wherein said control means includes means for terminating further displacement of said arm when said displacement of said light spot on said photodiode exceeds a given maximum distance.

13. Relative movement sensing apparatus, comprising:
   a light source;
   a first member;
   a second member resiliently mounted on said first member, being relatively movable with respect thereto;
   a lateral effect photodiode having a light sensitive surface, said photodiode being mounted in a fixed position with respect to one of said members and including means for generating an electrical signal representative of a relative position between said members; and
   means for directing a portion of the light from said light source from a particular location relative to the other of said members, to a particular location on said light sensitive surface.

14. The apparatus of claim 13, wherein said means for directing a portion of the light from said light source is a light-focusing lens.

15. The apparatus of claim 13, wherein the means for resiliently mounting said second member on said first member includes a high compliance spring comprising a multiplicity of flat discs with each of said discs having a flat surface thereof adjacent the flat surface of another disc, the disc surfaces being generally orthogonal to a particular axial direction with said discs being encapsulated in an elastomeric material such that forces applied to said spring lateral to said axial direction can produce significant disc movement in said lateral direction and only negligible disc movement along said particular axial direction.

16. Robot arm drive force interrupting apparatus, comprising:
   a light source;
   an energizeable robot arm drive member;
   a robot arm driven member resiliently mounted on said drive member, being relatively movable with respect thereto;
   a lateral effect photodiode having a light sensitive surface, said photodiode being mounted in a fixed position with respect to one of said members and including means for generating an electrical signal representative of a relative position between said members;
   means for directing a portion of the light from said light source from a particular location relative to the other of said members, to a particular location on said light sensitive surface; and
   means responsive to said relative position signal for disabling said robot arm drive member when said signal is greater than or equal to a predetermined magnitude.

17. Drive force magnitude regulating apparatus, comprising:
   a light source;
   an energizeable drive member;
   a driven member mounted on said drive member through a spring member having a known spring rate, said driven member being movable with respect to said drive member;
   a lateral effect photodiode having a light sensitive surface, said photodiode being mounted in a fixed position with respect to one of said members and including means for generating an electrical signal representative of a relative position between said members;
   means for directing a portion of the light from said light source from a particular location relative to the other of said members, to a particular location on said light sensitive surface; and
   means responsive to said relative position signal for controlling the movement of said drive member to thereby control the magnitude of the drive force provided by said driven member.

18. The apparatus of claim 13, wherein the means for resiliently mounting said second member on said first member includes a plurality of compliant pads.

19. The apparatus of claims 16 or 17, wherein the means for mounting said second member on said first member includes a plurality of compliant pads.

* * * * *